(12) United States Patent
Arbesman

(10) Patent No.: US 10,010,923 B1
(45) Date of Patent: Jul. 3, 2018

(54) TEXTURED SHEET METAL

(71) Applicant: NuGripmetal S.a.r.l, Luxembourg (LU)

(72) Inventor: Ray Arbesman, Toronto (CA)

(73) Assignee: NUGRIPMETAL S.A.R.L., Luxembourg (LU)

( * ) Notice: Subject to any disclaimer, the term of this patent is extended or adjusted under 35 U.S.C. 154(b) by 0 days.

(21) Appl. No.: 15/703,210

(22) Filed: Sep. 13, 2017

(51) Int. Cl.
*B32B 3/26* (2006.01)
*B32B 3/30* (2006.01)
(Continued)

(52) U.S. Cl.
CPC ............ *B21D 28/10* (2013.01); *B21D 31/02* (2013.01); *B21J 5/08* (2013.01); *B21J 5/12* (2013.01); *B32B 3/26* (2013.01); *B32B 3/30* (2013.01); *B32B 5/18* (2013.01); *B32B 7/08* (2013.01); *B32B 15/04* (2013.01); *B32B 15/06* (2013.01); *B32B 15/08* (2013.01); *B32B 15/10* (2013.01); *B32B 15/18* (2013.01); *B32B 15/20* (2013.01);
(Continued)

(58) Field of Classification Search
CPC .. B32B 3/26; B32B 3/30; B32B 15/20; B32B 7/08; B32B 37/14; B32B 37/02; B32B 15/10; B32B 15/18; B32B 15/08; B32B 15/06; B32B 15/04; B32B 37/20; B32B 37/10; B32B 37/08; B32B 37/06; B32B 38/00; B32B 38/04; B32B 5/18; F16C 69/00; F16C 69/04; F16C 2069/0491; F16C 2069/0441; B21J 5/12; B21J 5/08; B21D 31/02; B21D 28/10; Y10T 428/24355; Y10T 428/12375; Y10T 428/12382; Y10T 428/12396; Y10T 428/1241; Y10T 428/12389; Y10T 428/12417; Y10T 428/12993; Y10T 428/2495; Y10T 428/24967; Y10T 428/26
See application file for complete search history.

(56) References Cited

U.S. PATENT DOCUMENTS

| 1,897,088 A | 2/1933 | Victor |
| 1,915,221 A | 6/1933 | Fitzgerald |
| (Continued) | | |

FOREIGN PATENT DOCUMENTS

| CA | 1337622 | 11/1995 |
| CA | 2391183 | 12/2003 |
| (Continued) | | |

OTHER PUBLICATIONS

ALBA Gaskets, Tanged Graphite, Data/Specification Sheet, 1 page.
(Continued)

*Primary Examiner* — Michael E. La Villa
(74) *Attorney, Agent, or Firm* — Kilpatrick Townsend & Stockton LLP

(57) ABSTRACT

A material includes a sheet of metal having a first face and an opposed second face, and a metal grain direction. The first face is textured with a first set of texturing features. Each texturing feature of the first set includes, respectively, a groove cut into the first face and extending along a groove axis, and a barb extending from the groove and away from the first face. The texturing features of the first set are arranged in a plurality of rows, and the groove axes of the texturing features in a given row extend generally parallel to the given row. The rows are generally non-perpendicular to the grain direction.

10 Claims, 8 Drawing Sheets

(51) Int. Cl.

| | | |
|---|---|---|
| *B32B 15/20* | (2006.01) | |
| *B21J 5/12* | (2006.01) | |
| *B21J 5/08* | (2006.01) | |
| *B21D 28/10* | (2006.01) | |
| *B21D 31/02* | (2006.01) | |
| *B32B 7/08* | (2006.01) | |
| *B32B 15/10* | (2006.01) | |
| *B32B 37/14* | (2006.01) | |
| *B32B 15/18* | (2006.01) | |
| *B32B 15/06* | (2006.01) | |
| *B32B 37/02* | (2006.01) | |
| *B32B 15/08* | (2006.01) | |
| *B32B 38/00* | (2006.01) | |
| *B32B 5/18* | (2006.01) | |
| *B32B 37/08* | (2006.01) | |
| *B32B 15/04* | (2006.01) | |
| *B32B 37/20* | (2006.01) | |
| *B32B 37/06* | (2006.01) | |
| *F16D 69/00* | (2006.01) | |
| *B32B 37/10* | (2006.01) | |
| *B32B 38/04* | (2006.01) | |
| *F16D 69/04* | (2006.01) | |

(52) U.S. Cl.
CPC ............ *B32B 37/02* (2013.01); *B32B 37/06* (2013.01); *B32B 37/08* (2013.01); *B32B 37/10* (2013.01); *B32B 37/14* (2013.01); *B32B 37/20* (2013.01); *B32B 38/00* (2013.01); *B32B 38/04* (2013.01); *F16D 69/00* (2013.01); *F16D 69/04* (2013.01); *F16D 2069/0441* (2013.01); *F16D 2069/0491* (2013.01); *Y10T 428/1241* (2015.01); *Y10T 428/12375* (2015.01); *Y10T 428/12382* (2015.01); *Y10T 428/12389* (2015.01); *Y10T 428/12396* (2015.01); *Y10T 428/12417* (2015.01); *Y10T 428/12993* (2015.01); *Y10T 428/2495* (2015.01); *Y10T 428/24355* (2015.01); *Y10T 428/24967* (2015.01); *Y10T 428/26* (2015.01)

(56) References Cited

U.S. PATENT DOCUMENTS

| | | | |
|---|---|---|---|
| 2,171,530 A | 9/1939 | Balfe | |
| 2,255,268 A | 9/1941 | Perrine | |
| 2,781,097 A | 2/1957 | Hans | |
| 3,092,532 A | 6/1963 | Victor et al. | |
| 3,170,354 A | 2/1965 | Scholl | |
| 3,533,891 A | 10/1970 | Puyear | |
| 3,551,232 A | 12/1970 | Thompson | |
| 3,557,407 A | 1/1971 | Lemelson | |
| 3,605,360 A | 9/1971 | Lindal | |
| 3,615,994 A | 10/1971 | Maclaine et al. | |
| 3,677,055 A | 7/1972 | Longhi | |
| 4,023,613 A | 5/1977 | Uebayasi et al. | |
| 4,234,638 A | 11/1980 | Yamazoe et al. | |
| 4,552,252 A | 11/1985 | Stahl | |
| 4,569,424 A | 2/1986 | Taylor, Jr. | |
| 4,640,390 A | 2/1987 | Saumweber et al. | |
| 4,705,278 A | 11/1987 | Locacius et al. | |
| 4,723,783 A | 2/1988 | Belter et al. | |
| 4,776,602 A | 10/1988 | Gallo | |
| 4,781,389 A | 11/1988 | Beyer et al. | |
| 4,815,172 A | 3/1989 | Ward | |
| 4,911,972 A | 3/1990 | Mercuri | |
| 4,939,818 A | 7/1990 | Hahn | |
| 5,067,210 A | 11/1991 | Keyaki | |
| 5,142,743 A | 9/1992 | Hahn | |
| 5,143,184 A | 9/1992 | Snyder et al. | |
| 5,172,920 A | 12/1992 | Schlenk | |
| 5,362,074 A | 11/1994 | Gallo et al. | |
| 5,376,410 A | 12/1994 | Mackelvie | |
| 5,469,604 A | 11/1995 | Calmettes et al. | |
| D374,609 S | 10/1996 | Akeno | |
| D376,533 S | 12/1996 | Akeno | |
| 5,611,122 A | 3/1997 | Torigoe et al. | |
| 5,788,247 A | 8/1998 | Tensor | |
| D400,427 S | 11/1998 | Okawa et al. | |
| 5,842,546 A | 12/1998 | Biswas | |
| 5,896,629 A | 4/1999 | Van Hooreweder | |
| D425,405 S | 5/2000 | Naohara et al. | |
| 6,247,704 B1 | 6/2001 | Battistoni | |
| 6,258,457 B1 | 7/2001 | Ottinger et al. | |
| 6,276,045 B1 | 8/2001 | Buchi et al. | |
| 6,279,222 B1 | 8/2001 | Bunker et al. | |
| 6,431,331 B1 | 8/2002 | Arbesman | |
| 6,464,047 B1 | 10/2002 | Arbesman | |
| 6,622,346 B2 | 9/2003 | Graham et al. | |
| 6,671,935 B2 | 1/2004 | Filion et al. | |
| 6,843,095 B2 | 1/2005 | Arbesman | |
| 6,860,368 B2 | 3/2005 | Kulis, Jr. et al. | |
| 6,910,255 B2 | 6/2005 | Arbesman | |
| 6,913,673 B2 | 7/2005 | Baggot et al. | |
| 7,048,097 B2 | 5/2006 | Arbesman | |
| 7,222,701 B2 | 5/2007 | Pham | |
| 7,320,386 B2 | 1/2008 | Kulis, Jr. et al. | |
| 7,686,142 B2 | 3/2010 | Jung | |
| 7,841,052 B2 | 11/2010 | Ducauchuis | |
| 7,989,049 B2 | 8/2011 | Potier | |
| 8,048,507 B2 | 11/2011 | Townsend et al. | |
| 8,088,316 B2 | 1/2012 | Muth et al. | |
| D654,355 S | 2/2012 | Cheng | |
| 8,407,864 B2 | 4/2013 | Mask et al. | |
| 8,683,840 B2 | 4/2014 | Tuma et al. | |
| 8,685,520 B2 | 4/2014 | Meyer et al. | |
| 9,259,899 B1 | 2/2016 | Arbesman | |
| 9,273,741 B1 | 3/2016 | Arbesman et al. | |
| 9,291,225 B2 | 3/2016 | Arbesman et al. | |
| 9,360,067 B1 | 6/2016 | Arbesman et al. | |
| 9,388,872 B1 | 7/2016 | Arbesman et al. | |
| 2002/0169435 A1 | 11/2002 | Neeb et al. | |
| 2002/0170789 A1 | 11/2002 | Poelemans | |
| 2004/0016608 A1 | 1/2004 | Gutowski | |
| 2004/0140165 A1 | 7/2004 | Pham | |
| 2005/0170157 A1 | 8/2005 | Armela et al. | |
| 2006/0027427 A1 | 2/2006 | Anda et al. | |
| 2006/0087053 A1 | 4/2006 | O'Donnell et al. | |
| 2006/0118238 A1 | 6/2006 | Borazghi | |
| 2006/0243017 A1 | 11/2006 | Jung et al. | |
| 2006/0246256 A1 | 11/2006 | Ausen et al. | |
| 2008/0003401 A1 | 1/2008 | Barnes et al. | |
| 2008/0217809 A1 | 9/2008 | Zhao et al. | |
| 2009/0223753 A1 | 9/2009 | Kappagantu et al. | |
| 2010/0170758 A1 | 7/2010 | Chen | |
| 2010/0207334 A1 | 8/2010 | Virgin et al. | |
| 2011/0051724 A1 | 3/2011 | Scott et al. | |
| 2011/0079065 A1 | 4/2011 | Cabanski et al. | |
| 2011/0233875 A1 | 9/2011 | Shaver et al. | |
| 2011/0260371 A1 | 10/2011 | Arora et al. | |
| 2012/0003462 A1 | 1/2012 | Wong | |
| 2012/0006959 A1 | 1/2012 | Braun et al. | |
| 2013/0152654 A1 | 6/2013 | Arbesman et al. | |
| 2013/0175127 A1 | 7/2013 | Mackelvie | |
| 2015/0053517 A1 | 2/2015 | Arbesman et al. | |
| 2015/0086750 A1* | 3/2015 | Arbesman | B21D 31/02 |
| | | | 428/141 |
| 2015/0099093 A1 | 4/2015 | Arbesman et al. | |
| 2015/0140255 A1 | 5/2015 | Mackelvie | |
| 2015/0204400 A1 | 7/2015 | Arbesman et al. | |
| 2015/0239201 A1 | 8/2015 | Walker | |
| 2016/0023311 A1 | 1/2016 | Arbesman | |
| 2016/0046110 A1 | 2/2016 | Broering et al. | |
| 2016/0091041 A1 | 3/2016 | Arbesman | |
| 2016/0091042 A1 | 3/2016 | Arbesman et al. | |
| 2016/0091043 A1 | 3/2016 | Arbesman | |
| 2016/0160944 A1 | 6/2016 | Arbesman et al. | |

(56) References Cited

U.S. PATENT DOCUMENTS

2016/0176152 A1 6/2016 Mackelvie
2016/0230792 A1 8/2016 Arbesman et al.

FOREIGN PATENT DOCUMENTS

| | | |
|---|---|---|
| CA | 2272115 | 6/2004 |
| CA | 2778455 | 11/2013 |
| CA | 145893 | 12/2013 |
| CA | 2855378 | 1/2016 |
| CN | 1286625 | 11/2006 |
| CN | 102272471 | 12/2011 |
| DE | 19754740 | 3/1999 |
| DE | 102004048464 | 4/2006 |
| DE | 102006015100 | 10/2007 |
| DE | 102006015145 | 10/2007 |
| DE | 102006015148 | 10/2007 |
| EP | 859163 | 8/1998 |
| EP | 934820 | 8/1999 |
| GB | 2125126 | 2/1984 |
| GB | 2359186 | 8/2001 |
| GB | 2507128 | 4/2014 |
| JP | 48072067 | 9/1973 |
| JP | 49126532 | 12/1974 |
| JP | 05285561 | 11/1993 |
| JP | 08021462 | 1/1996 |
| JP | 11309524 | 11/1999 |
| JP | 2001001058 | 1/2001 |
| JP | 2003154423 | 5/2003 |
| JP | 2013089799 | 5/2013 |
| WO | 2010105017 | 9/2010 |
| WO | 2011051724 | 5/2011 |
| WO | 2015157846 | 10/2015 |
| WO | 2016103099 | 6/2016 |

OTHER PUBLICATIONS

CIXI Cazseal Packing & Gasket Co., Graphite Sheet with Tanged Metal CAZ Grafoil™ 440T, Joint Sheets, 1 page.
DYNOTEQ, SLT-20 Tang Sheet Specifications, 1 page.
Environmental Gasket Company Ltd., Creating a Safer, Cleaner and More Reliable Manufacturing Environment, Graphite Sheet Gaskets, 2009, 5 pages.
Gee Graphite, Tanged Stainless Steel Reinforced Graphite Sheet, Gee Graphite Data Sheet, 1 page.
James Walker & Co., Supagraf® expanded graphite jointings, Supagraf Tanged T10, 1 page.
Ningbo Sunwell Fluid Technologies Co. Ltd., Tanged Metal Reinforced Graphite Gasket, Data Sheets, 2010, 1 page, Sep. 2010.
SPG Gaskets Co., Specification Sheet: SPG7003, 1 page.

* cited by examiner

TEXTURED SHEET METAL

FIELD

This document relates to sheet metal, and the working or processing of sheet metal. More specifically, this document relates to processes and apparatuses for texturing sheet metal with barbs, and to sheet metal textured with barbs.

BACKGROUND

U.S. Pat. No. 9,463,502 (Arbesman et al.) discloses a process for making bulk textured material sheeting. As a continuous supply of flat material sheeting is fed, the sheeting is repeatedly impacted with toothed knives, each knife creating a row of raised and generally pointed structures on the sheeting to texture the sheeting.

SUMMARY

The following summary is intended to introduce the reader to various aspects of the detailed description, but not to define or delimit any invention.

A material is disclosed. According to some aspects, the material includes a sheet of metal having a first face and an opposed second face, and a metal grain direction. The first face is textured with a first set of texturing features. Each texturing feature of the first set includes, respectively, a groove cut into the first face and extending along a groove axis, and a barb extending from the groove and away from the first face. The texturing features of the first set are arranged in a plurality of rows. The groove axes of the texturing features in a given row extend generally parallel to the given row. The rows are generally non-perpendicular to the grain direction.

In some examples, the rows are generally parallel to the grain direction. In some examples, the rows are inclined with respect to the grain direction.

In some examples, the sheet of metal has a length and a width, and the grain direction is generally parallel to the length.

In some examples, the sheet of metal has a first end and an opposed second end, and the plurality of rows includes a first row and a second row adjacent to the first row. The groove of each texturing feature of the first row may be oriented towards the first end and the barb of each texturing feature of the first row may be oriented towards the second end. The groove of each texturing feature of the second row may be oriented towards the second end and the barb of each texturing feature of the second row may be oriented towards the first end.

In some examples, the second face is textured with a second set of texturing features. Each texturing feature of the second set may include, respectively, a second set groove cut into the second face and extending along a second set groove axis, and a second set barb extending from the second set groove and away from the second face.

In some examples, the texturing features of the second set are arranged in a plurality of second set rows. The second set groove axes of the texturing features in a given second set row may extend generally parallel to the given second set row. The second set rows may be generally non-perpendicular to the grain direction.

In some examples, the material is wound about a coil axis into a coil, and the coil axis is generally perpendicular to the grain direction.

In some examples, each barb includes a base adjacent the first face, a shank adjacent the barb base, and a pointed tip adjacent the shank.

In some examples, the sheet of metal has a thickness of as low as 0.25 mm, for example between 0.25 mm and 2.0 mm.

A process for producing a textured sheet of metal is also disclosed. According to some aspects, the process includes a) feeding a sheet of metal into a texturing apparatus. The sheet of metal extends along a longitudinal axis and is fed into the texturing apparatus in a direction generally parallel to the longitudinal axis. The process further includes b) actuating a knife of the texturing apparatus to impact the sheet. The impact gouges at least one groove into the sheet and creates a barb with the material removed in creating the groove. The knife is actuated towards the sheet and across the sheet in a direction that is generally non-perpendicular to the longitudinal axis.

In some examples, the knife is actuated towards the sheet and across the sheet in a direction that is generally parallel to the longitudinal axis. In some examples, the knife is actuated towards the sheet and across the sheet in a direction that is inclined with respect to the longitudinal axis.

In some examples, the knife extends along a generally horizontal knife axis, and includes a plurality of teeth that are spaced apart along the knife axis. In some examples, step b) includes actuating the knife so that each tooth impacts the sheet, to create a row of the grooves and the barbs in the sheet.

In some examples, the knife axis is generally non-perpendicular to the longitudinal axis. In some examples, the knife axis is generally parallel to the longitudinal axis.

In some examples, the sheet of metal has a metal grain direction that is generally parallel to the longitudinal axis.

In some examples, the sheet of metal is fed from a coil into the texturing apparatus. The coil may be wound about a coil axis, and the coil axis may be non-parallel to the grain direction.

A texturing apparatus is also disclosed. According to some aspects, the texturing apparatus includes a base for receiving a section of a sheet of metal. The base extends along a base axis between a metal receiving end of the apparatus and a metal dispensing end of the apparatus. At least a first knife is mounted above the base. The first knife extends along a generally horizontal knife axis, and includes a plurality of teeth that are spaced apart along the knife axis. The first knife is moveable vertically towards the base and horizontally across the base. The knife axis is generally non-perpendicular to the base axis.

In some examples, the knife axis is generally parallel to the base axis. In some examples, the knife axis is inclined with respect to the base axis.

In some examples, the texturing apparatus further includes a second knife mounted above the base. The second knife may extend generally parallel to the knife axis and may be moveable vertically towards the base and horizontally across the base.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of the claimed subject matter. No embodiment described below limits any claim and any claim may cover processes or apparatuses that differ from those described below. The claims are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Disclosed herein is a textured sheet metal, and a process and apparatus for texturing sheet metal. The textured sheet metal may have beneficial properties, such as high tensile strength and high yield strength along its grain direction.

Figure 1:
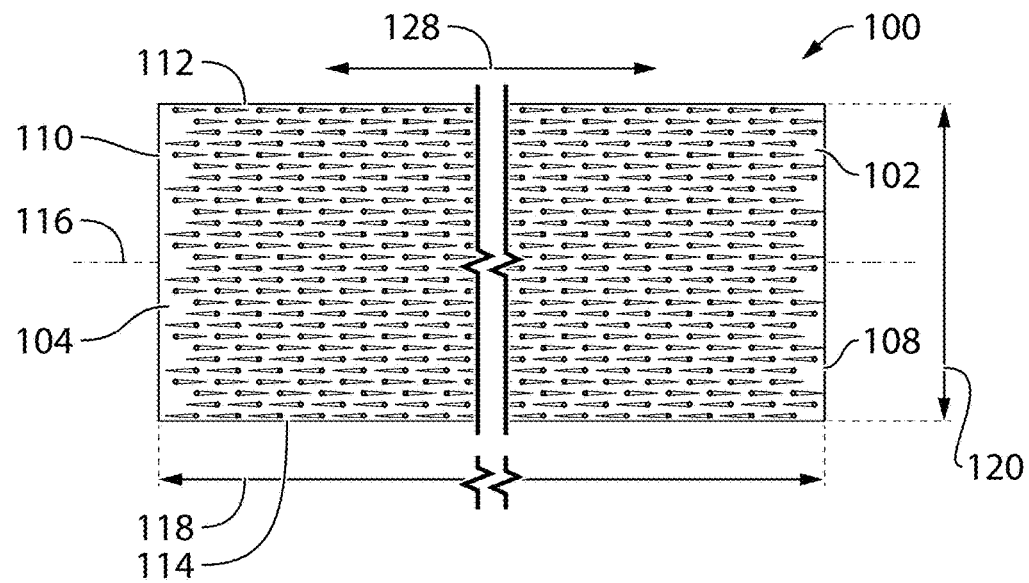
FIG. 1 is a top view of an example material.

Referring now to FIG. 1, an example material 100 is shown. The material 100 includes a sheet 102 of metal, which has a first face 104 and an opposed second face 106 (shown in FIG. 5), a first end 108 and an opposed second end 110, and a first side 112 and an opposed second side 114. The sheet 102 of metal further has a longitudinal axis 116, a length 118 and a width 120. In some examples, the length 118 may be significantly larger than the width 120, and the sheet 102 of metal may be wound about a coil axis 722 into a coil 724 (shown in FIG. 7). The sheet 102 of metal may be, for example, a sheet of steel, aluminum, brass, copper, or another metal or alloy. The sheet 102 of metal may have a thickness 126 (shown in FIG. 5) of as low as 0.25 mm, for example between 0.25 mm and 2.0 mm.

Referring still to FIG. 1, the sheet 102 of metal has a grain direction 128 (also known as a grain orientation), resulting from its processing conditions. In the example shown, the grain direction 128 is generally parallel to the length 118, and the coil axis 122 is generally perpendicular to the grain direction 128. As used herein, the phrase "generally parallel" indicates that referenced features are exactly parallel, or within 10 degrees of being parallel. As used herein, the phrase "generally perpendicular" indicates that referenced features are exactly perpendicular, or within 10 degrees of being perpendicular.

Figure 2:
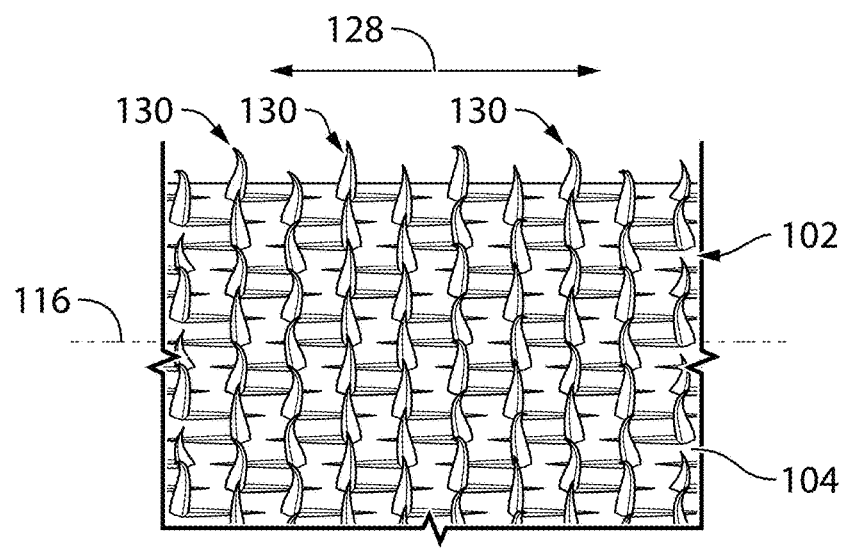
FIG. 2 is an enlarged perspective view of a section of the material of FIG. 1.
Figure 3:
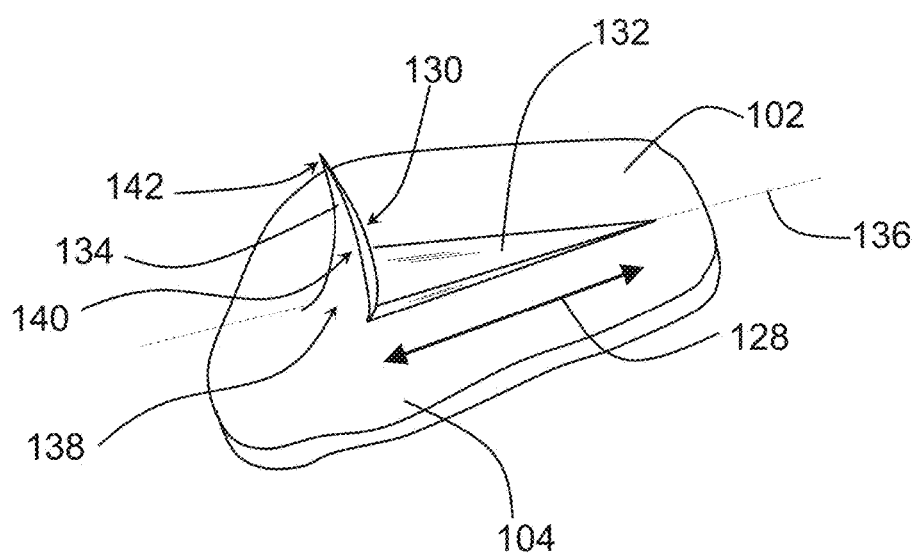
FIG. 3 is a further enlarged perspective view of a section of the material of FIG. 1.

Referring to FIG. 2, in the example shown, the first face 104 is textured with a set of texturing features 130 (only some of which are labeled in the drawings). Referring to FIG. 3, each texturing feature 130 includes, respectively, a groove 132 cut into the first face 104, and a barb 134 extending from the groove 132 and generally away from the first face 104. As will be described in further detail below, each groove 132 may be cut into the first face 104 in a gouging operation whereby a tool impacts the first face 104 and moves across the first face 104 to gouge the groove 132 into the first face 104 and create the barb 134 from the material removed in creating the groove 132. Each groove 132 extends along a groove axis 136, corresponding to the direction movement of the tool across the first face 104.

The barbs 134 can have a variety of shapes. Referring to FIG. 3, in the example shown, each barb 134 has a base 138 adjacent the first face 104, a shank 140 adjacent the base 138, and a tip 142 adjacent the shank 140. The shanks 140 can be straight or curved or twisted or hooked (or a suitable combination of these configurations, e.g. curved and twisted). The tips 142 can point upward (away from the first face 104) or downward (towards the first face 104) or sideways. The tips 142 can be pointed or blunt. The barbs 134 can all have the same shape, or some barbs 134 may have a different shape from other barbs 134.

Figure 5:
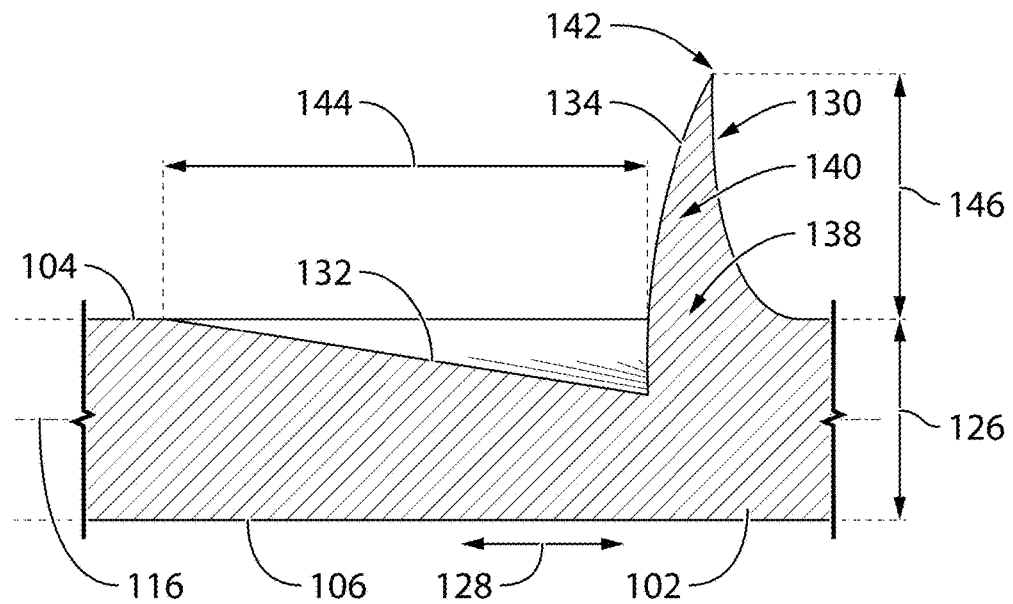
FIG. 5 is a cross-section taken along line 5-5 in FIG. 4.

The barbs 134 can have a variety of sizes. Referring to FIG. 5, in the example shown, each barb 134 has a length (not labelled) and a height 146. The height 146 is the perpendicular distance from the first face 104 to the point on the barb 134 that is furthest from the first face 104. In instances where a barb is straight and perpendicular to the first face 104, the length of the barb may be generally equal to the height of the barb. In instances where a barb is curved, the length of the barb may be greater than the height 146 of the barb. The barbs 134 can all have the same length and height, or some barbs 134 may have a different length and height from other barbs. In some examples, the barb length may be greater than the thickness of the sheet 102, for example up to 100%, 200%, or 300% greater than the thickness of the sheet 102. Each groove 134 also has a length 144.

Figure 4:
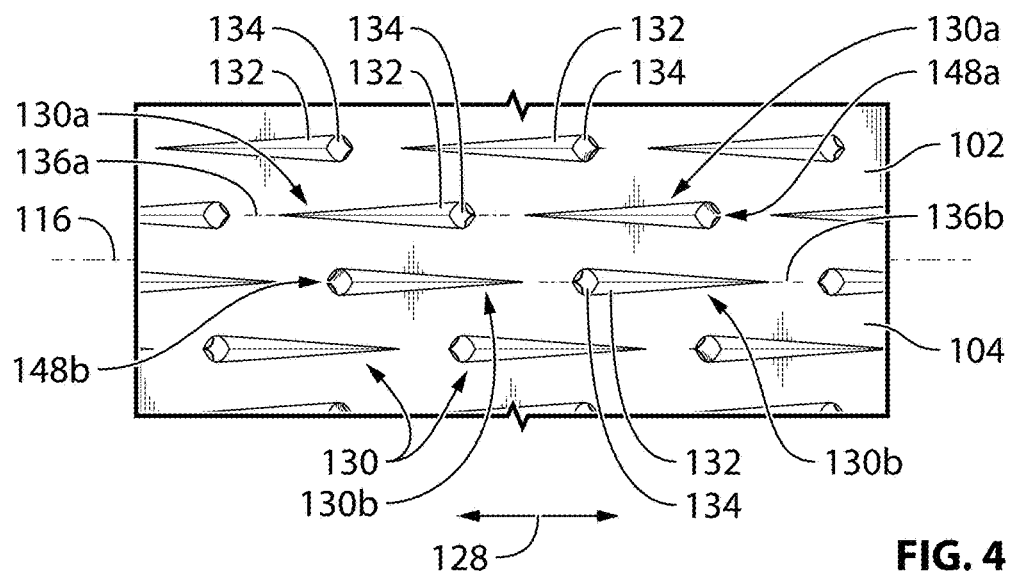
FIG. 4 is an enlarged top view of a section of the material of FIG. 1.

Referring now to FIG. 4, in the example shown, the texturing features 130 are arranged in a plurality of rows 148 (e.g. a first row 148a, a second row 148b adjacent to the first row 148a, and so on). The groove axes 136 of the texturing features 130 in a given row extend generally parallel to the given row. That is, the groove axes 136a of the texturing features 130a in row 148a extend generally parallel to row 148a, the groove axes 136b of the texturing features 130b in row 148b extend generally parallel to row 148b, and so on. Furthermore, the rows 148 are generally non-perpendicular to the grain direction 128. As used herein, the term 'generally non-perpendicular' indicates that the referenced features are not exactly perpendicular, and are not at an angle that is within 10 degrees of being perpendicular. Specifically, in the example shown, the rows 148a, 148b are generally parallel to the grain direction 128. In alternative examples, the rows may be inclined with respect to the grain direction 128.

Referring still to FIG. 4, the texturing features in a given row may have an opposite orientation with respect to the texturing features in an adjacent row. Specifically, in the example shown, for the texturing features 130a in row 148a, the grooves 132 are oriented towards (or point towards) the first end 108 of the sheet 102 and the barbs 134 are oriented towards the second end 110 of the sheet 102. For the texturing features 130*b* in row 148*b*, the grooves 132 are oriented towards (or point towards) the second end 110 of the sheet 102 and the barbs 134 are oriented towards the first end 108 of the sheet 102. As will be described below, this can be achieved by moving a tool across the sheet 102 in a first direction to create the texturing features 130*a* of the first row 148*a*, and moving the tool (or another tool) across the sheet 102 in a second direction opposite to the first direction to create the texturing features 130*b* of the second row 148*b*.

Figure 6:
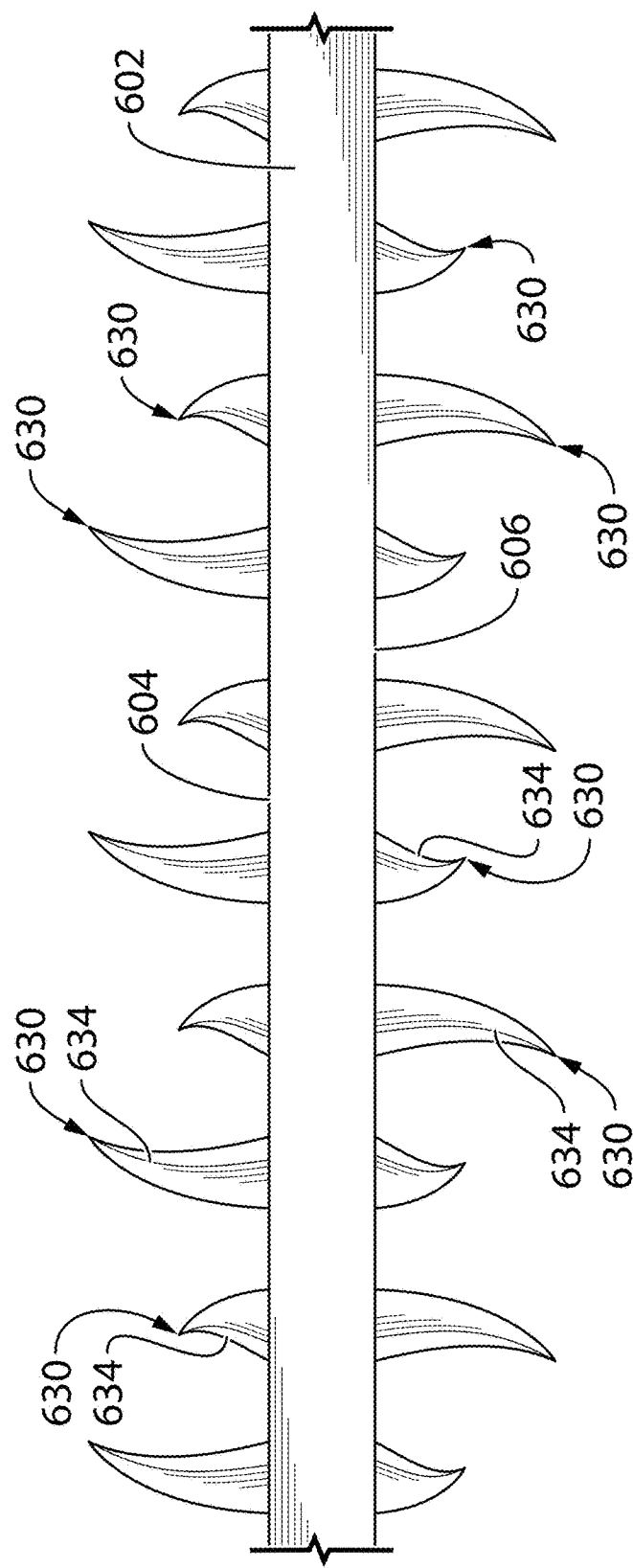
FIG. 6 is an enlarged side view of another example material.

In the example of FIGS. 1 to 5, only the first face 104 of the sheet 102 has texturing features 130. In alternative examples, as shown in FIG. 6, wherein like reference numerals are used to refer to like features as in FIGS. 1 to 5, with reference numerals incremented by 500, the second face 606 of the sheet 602 also has texturing features 630. In such examples, the texturing features 630 of the first face 604 may be referred to as a first set of texturing features, and the texturing features 630 of the second face 606 may be referred to as a second set of texturing features. In the example shown, similarly to the texturing features 630 of the first face 604, each texturing feature 630 on the second face 606 may include a groove (not shown) (also referred to herein as a 'second set groove') cut into the second face 606 and extending along a groove axis (not shown) (also referred to herein as a 'second set groove axis), and a barb 634 (also referred to herein as a 'second set barb') extending from the groove and away from the second face 606. Furthermore, in the example shown, similarly to the first set of texturing features, the texturing features 630 of the second set are arranged in rows (also referred to as 'second set rows'), with the groove axes of the texturing features in a given row extending parallel to the row, and with the rows being generally non-perpendicular to the grain direction.

A process and apparatus for producing a textured sheet of metal will now be described. The process and apparatus will be described with reference to the material 100 described above and shown in FIGS. 1 to 5; however, the process and apparatus are not limited to producing material 100, and material 100 is not limited to production by the process and apparatus. The process and apparatus will be described with reference to FIGS. 7 to 10, wherein like features to FIGS. 1 to 5 will be referred to with like reference numerals, incremented by 600.

Figure 7:
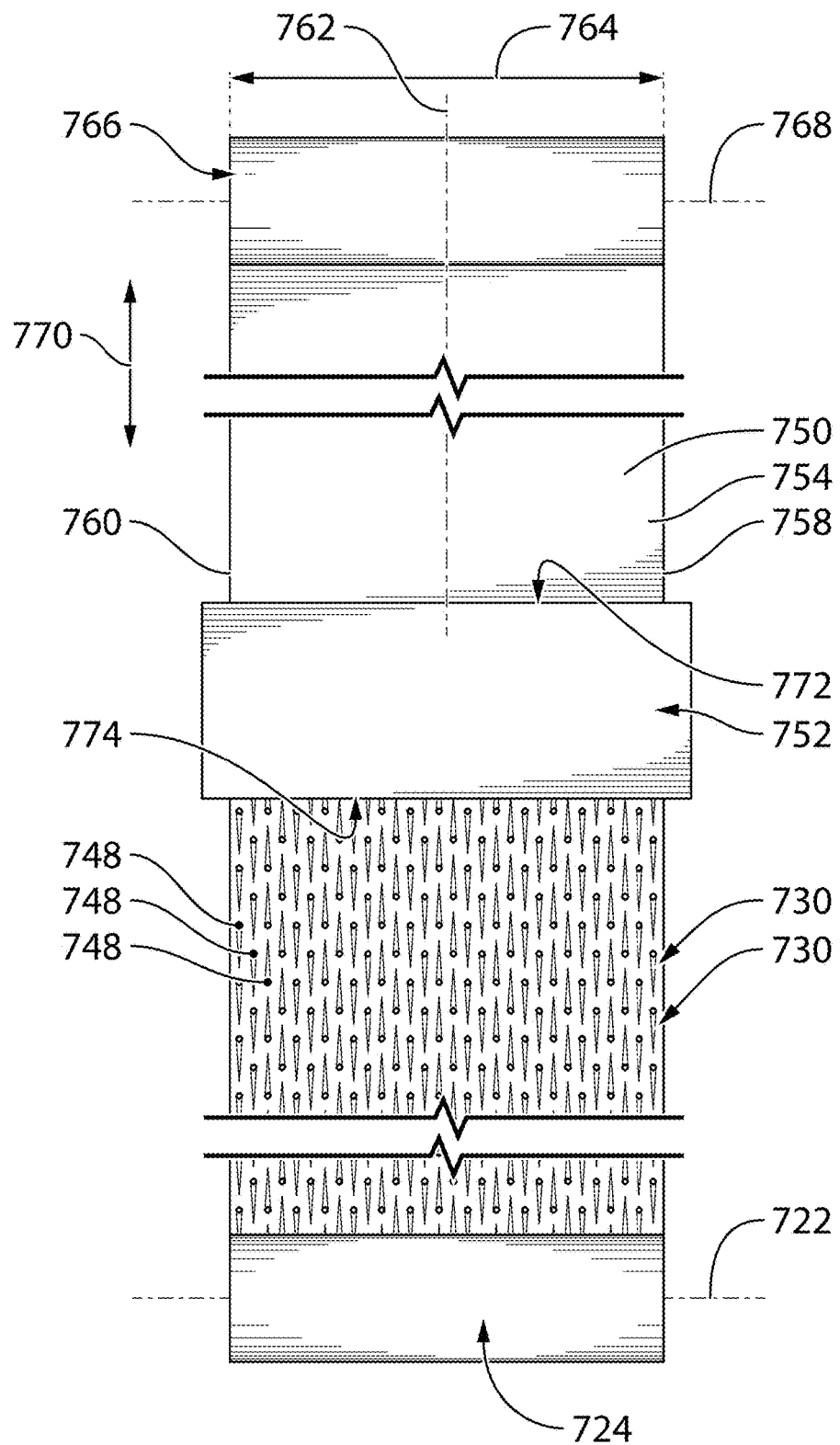
FIG. 7 is a top schematic view of a process and apparatus for producing a textured sheet of material like that of FIGS. 1 to 5.

Referring to FIG. 7, in the example shown, a raw sheet 750 of metal (i.e. a sheet of metal before texturization) is fed to a texturing apparatus 752.

In the example shown, the raw sheet 750 of metal has a first face 754 and an opposed second face 756 (shown in FIG. 9), and a first side 758 and an opposed second side 760. The raw sheet 750 of metal further has a longitudinal axis 762, a length (not shown) and a width 764. In the example shown, the length is significantly larger than the width 764, and the raw sheet 750 of metal is fed from a coil 766 to the texturing apparatus 752. The coil 766 is wound about a coil axis 768.

The raw sheet 750 of metal may be, for example, a sheet of steel, aluminum, brass, copper, or other another metal or alloy. The raw sheet 750 of metal may have a thickness 786 (shown in FIG. 9) of as low as 0.25 mm, for example between 0.25 mm and 2.0 mm.

The raw sheet 750 of metal has a grain direction 770, resulting from its processing conditions. In the example shown, the grain direction 770 is generally parallel to the longitudinal axis 762 and generally non-parallel to the coil axis 768.

Figure 8:
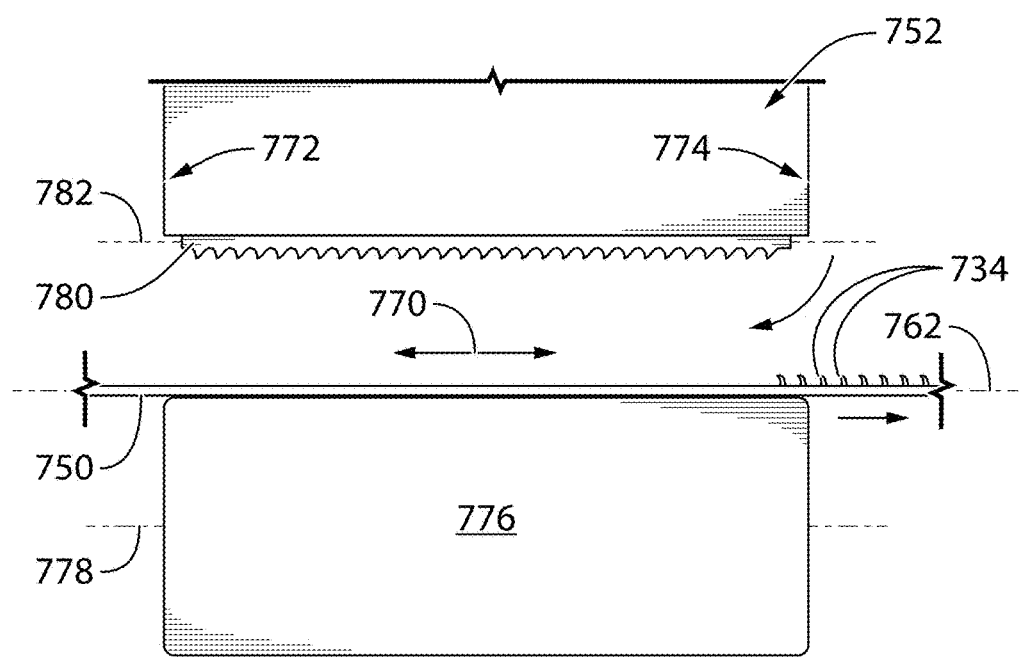
FIG. 8 is a schematic side view of the process and apparatus of FIG. 7.

Referring to FIGS. 7 and 8, in the example shown, the texturing apparatus 752 has a metal receiving end 772 and a metal dispensing end 774. The texturing apparatus 752 also has a base 776 for receiving a section of the raw sheet 750 of metal. The base 776 extends along a base axis 778 between of the metal receiving end 772 and the metal dispensing end 774. The raw sheet 750 of metal is fed into the metal receiving end 772 of the texturing apparatus 752, in a direction generally parallel to the longitudinal axis 762 and the base axis 778, so that a section of the raw sheet 750 of metal is seated on the base 776.

The texturing apparatus 752 can include one or more knives. As will be described in further detail, the knife/knives is/are actuated to impact the raw sheet 750, and the impact gouges at least one groove 732 into the sheet, and creates a barb 734 with the material removed in creating the groove 732.

Referring still to FIG. 8, in the example shown, the texturing apparatus 752 includes a set of knives, which are mounted above the base 776. A first one of the knives 780 is visible in FIG. 8; the remainder of the knives are behind the first one of the knives 780, and are hidden in FIG. 8.

Figure 9:
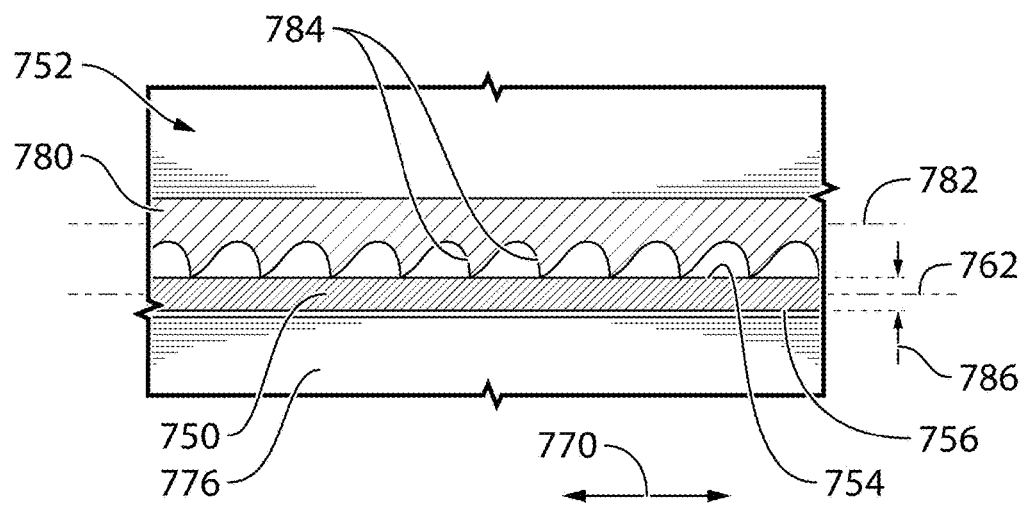
FIG. 9 is an enlarged side view of the process and apparatus of FIG. 8, showing a knife of the apparatus impacting a sheet of metal.
Figure 10:
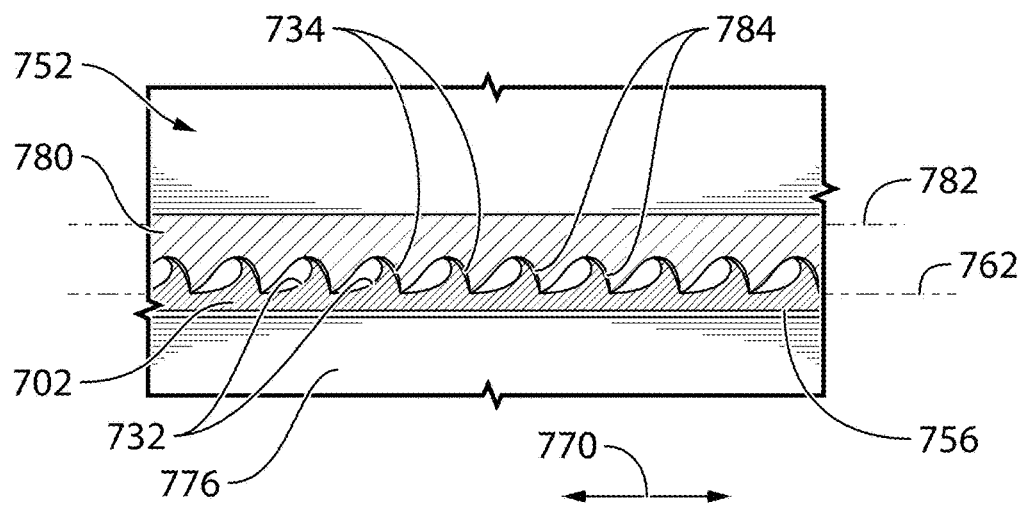
FIG. 10 is an enlarged side view of the process and apparatus of FIG. 8, showing a knife of the apparatus moving across the sheet of metal.

Referring to FIG. 8 in the example shown, the knife 780 extends along a generally horizontal knife axis 782, which is generally non-perpendicular to the base axis 778. In the example shown, the knife axis 782 is generally parallel to the base axis 778. In alternative examples, the knife axis 782 may be inclined with respect to the base axis 778. Referring to FIGS. 9 and 10, the knife 780 includes a plurality of teeth 784 that are spaced apart along the knife axis 782. The knife 780 is moveable vertically towards and away from the base 776 (i.e. in a direction generally perpendicular to the knife axis 782), and horizontally across the base 776 (i.e. in a direction generally parallel to the knife axis 782). The vertical and horizontal movement may occur simultaneously or sequentially.

Referring still to FIGS. 9 and 10, in the example shown, with the section of the raw sheet 750 seated on the base 776, the knife 780 is actuated, and moves downwards (towards the sheet 750 and the base 776), and horizontally (i.e. across the sheet 750 and the base 776) in a direction that is generally non-perpendicular to the longitudinal axis 762 of the raw sheet 750. In the example shown, the knife 780 is actuated across the raw sheet 750 in a direction that is generally parallel to the longitudinal axis 762. In alternative examples, the knife may be actuated across the sheet in a direction that is inclined with respect to the longitudinal axis.

The knife 780 is actuated downwards until the teeth 784 impact the raw sheet 750, as shown in FIG. 9, and across the raw sheet 750 to gouge the grooves 732 and barbs 734 into the raw sheet 750 and create the textured sheet 702, as shown in FIG. 10. In each actuation of the knife 780, each tooth 784 creates one texturing feature 730, so that the knife 780 as a whole creates a row 748 (shown in FIG. 7) of texturing features 730 in the sheet, with the rows 748 being generally non-perpendicular to the grain direction.

After impacting the raw sheet 750, the knife 780 may then be withdrawn from the now textured section of the sheet to its starting position, and the sheet 750 may be advanced so that the now-textured section of the sheet moves towards and out of the metal dispensing end 774, and another section of the raw sheet 750 enters the metal receiving end 772 and sits on the base 776. Actuation of the knife 780 may then be repeated.

As mentioned above, only one of the knives (i.e. knife 780) is visible in FIGS. 8 to 10. However, the remaining knives (e.g. a second knife, a third knife, and so on) may be configured and actuated in the same fashion as the knife 780 described above. In some examples, the remaining knives extend parallel to the knife axis 782. In some examples, all of the knives of the apparatus 752 are actuated simultaneously. Furthermore, in some examples, alternating knives 752 are actuated in horizontally opposite directions. That is, one knife may be actuated downwardly and horizontally towards the metal receiving end 772 of the apparatus, and an adjacent knife may be actuated downwardly and horizontally towards the metal dispensing 774 end of the apparatus. This can create alternating rows 748 with texturing features 730 oriented in opposite directions.

In some examples, the knives may be spaced apart across the entire width of the raw sheet 750, so that the sheet is textured across its entire width.

EXAMPLES

Materials & Methods

Figure 11:
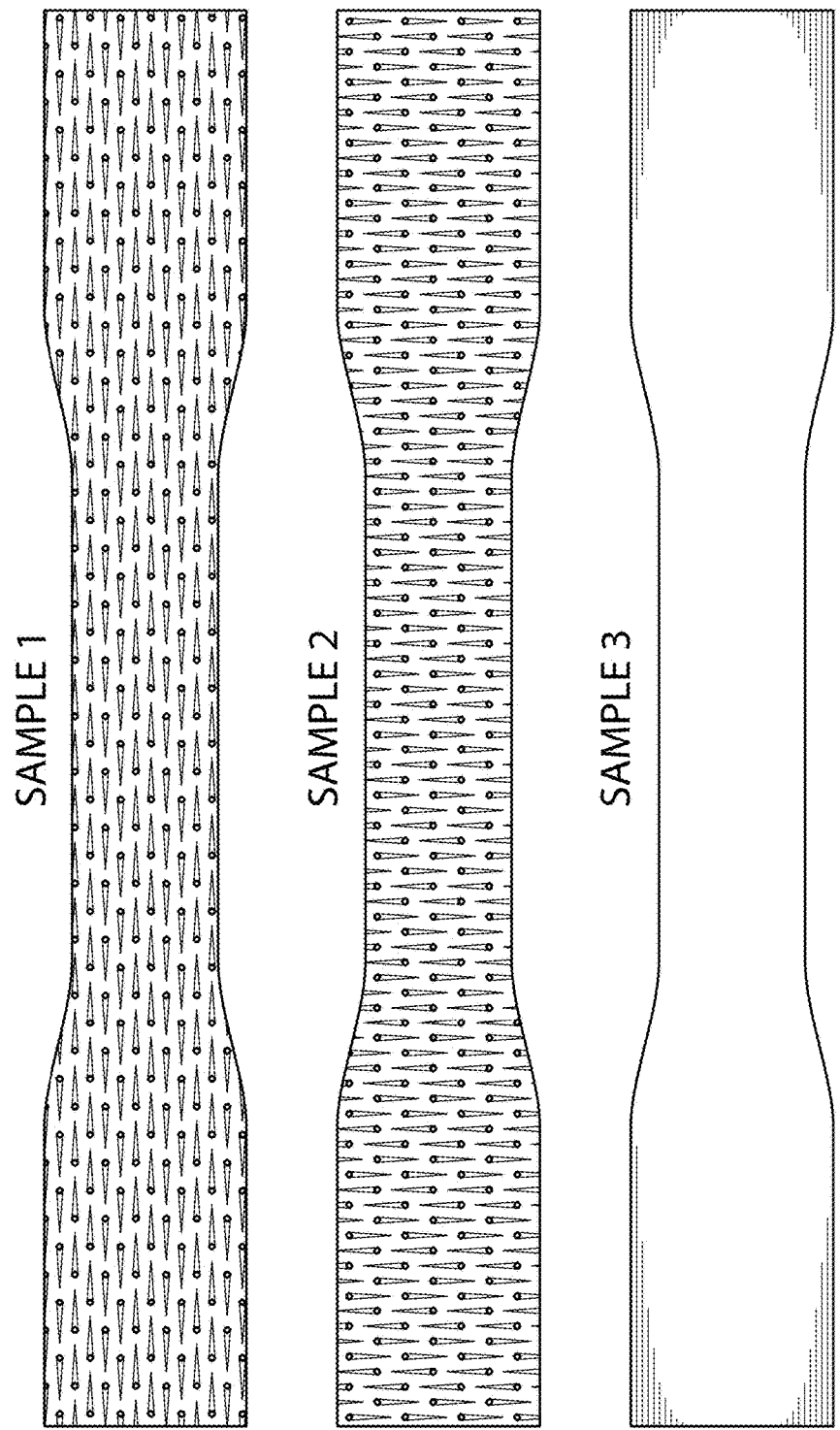
FIG. 11 is a top view of 3 samples whose properties were tested as described in the Examples section.

A tensile test was conducted on various samples of material, as described in Table 1. Sample size was based on ASTM A370 test strips. Samples 1 to 3 are depicted in FIG. 11. Samples 4 to 6 were similar to Samples 1 to 3. The tensile test returned the ultimate strength, yield strength and force versus displacement for each sample. The tensile test was based on ASTM A370-15 specifications. Three strips were tested for each sample no.

TABLE 1

| Sample No. | Description of Sheet of Metal | Material | Barb height | Sheet Thickness |
|---|---|---|---|---|
| 1 | Barbs on Only First Face Groove Axes Parallel to Rows Rows PARALLEL to grain direction | Steel | 1.65 mm | 0.508 mm |
| 2 | Barbs on Only First Face Groove Axes Parallel to Rows Rows PERPENDICULAR to grain direction | Steel | 1.65 mm | 0.508 mm |
| 3 | Control (no barbs) | Steel | 1.65 mm | 0.508 mm |
| 4 | Barbs on Only First Face Groove Axes Parallel to Rows Rows PARALLEL to grain direction | Aluminum | 1.65 mm | 0.508 mm |
| 5 | Barbs on Only First Face Groove Axes Parallel to Rows Rows PERPENDICULAR to grain direction | Aluminum | 1.65 mm | 0.508 mm |
| 6 | Control | Aluminum | 1.65 mm | 0.508 mm |

Results

Test results for Samples 1 to 3 (i.e. steel) are shown in Table 2

TABLE 2

| | Ultimate Tensile Strength (MPa) | | Yield Strength, MPa | | Elongation, % |
|---|---|---|---|---|---|
| Sample No. | Average | Standard Deviation | Average | Standard Deviation | Average |
| 1 | 763.02 | 17.4 | 726.25 | 15.9 | 1.00 |
| 2 | 532.05 | 17.4 | 520.55 | 6.9 | 1.00 |
| 3 | 776.81 | 4.0 | 737.74 | 24.9 | 2.33 |

Table 3 shows the percent change in ultimate tensile strength for samples 1 and 2 versus control.

TABLE 3

| Sample No. | Ultimate Tensile Strength (Change as compared to control) | Yield Strength (Change as compared to control) |
|---|---|---|
| 1 | −1.78% | −1.56% |
| 2 | −31.51% | −29.44% |

Test results for Samples 4 to 6 (i.e. aluminum) are shown in Table 4

TABLE 4

| | Ultimate Tensile Strength (MPa) | | Yield Strength, MPa | | Elongation, % |
|---|---|---|---|---|---|
| Sample No. | Average | Standard Deviation | Average | Standard Deviation | Average |
| 4 | 283.37 | 1.8 | 249.59 | 0.0 | 3.33 |
| 5 | 227.99 | 2.9 | 218.10 | 3.3 | 1 |
| 6 | 302.91 | 0.4 | 265.91 | 0.8 | 6 |

Table 5 shows the percent change in ultimate tensile strength for samples 4 and 5 versus control.

TABLE 5

| Sample No. | Ultimate Tensile Strength (Change as compared to control) | Yield Strength (Change as compared to control) |
|---|---|---|
| 4 | −6.45% | −6.14% |
| 5 | −24.73% | −17.98% |

DISCUSSION

The above results show that materials as described herein (e.g. as shown in FIGS. 1 to 5, where texturing features are arranged in rows, with the groove axes of the texturing features in a given row extending generally parallel to the given row, and with the rows generally non-perpendicular to the grain direction) can provide improved properties, such as improved tensile strength and yield strength.

While the above description provides examples of one or more processes or apparatuses, it will be appreciated that other processes or apparatuses may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

I claim:

1. A material comprising:
   a sheet of metal having a first face and an opposed second face, and a metal grain direction;
   wherein the first face is textured with a first set of texturing features, each texturing feature of the first set including, respectively, a groove cut into the first face and extending along a groove axis, and a barb extending from the groove and away from the first face;
   wherein the texturing features of the first set are arranged in a plurality of rows, wherein the groove axes of the texturing features in a given row extend generally parallel to the given row; and
   wherein the rows are generally non-perpendicular to the grain direction.

2. The material of claim 1, wherein the rows are generally parallel to the grain direction.

3. The material of claim 1, wherein the rows are inclined with respect to the grain direction.

4. The material of claim 1, wherein the sheet of metal has a length and a width, and the grain direction is generally parallel to the length.

5. The material of claim 1, wherein:
   i. the sheet of metal has a first end and an opposed second end;
   ii. the plurality of rows includes a first row and a second row adjacent to the first row;
   iii. the groove of each texturing feature of the first row is oriented towards the first end and the barb of each texturing feature of the first row is oriented towards the second end; and
   iv. the groove of each texturing feature of the second row is oriented towards the second end and the barb of each texturing feature of the second row is oriented towards the first end.

6. The material of claim 1, wherein:
   i. the second face is textured with a second set of texturing features;
   ii. each texturing feature of the second set includes, respectively, a second set groove cut into the second face and extending along a second set groove axis, and a second set barb extending from the second set groove and away from the second face.

7. The material of claim 6, wherein;
   i. the texturing features of the second set are arranged in a plurality of second set rows;
   ii. the second set groove axes of the texturing features in a given second set row extend generally parallel to the given second set row; and
   iii. the second set rows are generally non-perpendicular to the grain direction.

8. The material of claim 1, wherein the material is wound about a coil axis into a coil, and the coil axis is generally perpendicular to the grain direction.

9. The material of claim 1, wherein each barb includes a base adjacent the first face, a shank adjacent the barb base, and a pointed tip adjacent the shank.

10. The material of claim 1, wherein the sheet of metal has a thickness of between 0.25 mm and 2.0 mm.

* * * * *